United States Patent
Wiegers

(10) Patent No.: US 11,206,842 B2
(45) Date of Patent: Dec. 28, 2021

(54) LOW-BACTERIA MILK POWDERS WITH A HIGH WHEY PROTEIN NITROGEN INDEX (IV)

(71) Applicant: DMK Deutsches Milchkontor GmbH, Zeven (DE)

(72) Inventor: Torben Wiegers, Zeven (DE)

(73) Assignee: DMK Deutsches Milchkontor GmbH, Zeven (DE)

(*) Notice: Subject to any disclaimer, the term of this patent is extended or adjusted under 35 U.S.C. 154(b) by 288 days.

(21) Appl. No.: 15/643,575

(22) Filed: Jul. 7, 2017

(65) Prior Publication Data

US 2018/0084797 A1 Mar. 29, 2018

(30) Foreign Application Priority Data

Sep. 27, 2016 (EP) .................................... 16190754

(51) Int. Cl.
| | | |
|---|---|---|
| *A23C 9/16* | (2006.01) | |
| *A23C 9/15* | (2006.01) | |
| *A23C 9/142* | (2006.01) | |
| *A23C 9/148* | (2006.01) | |
| *A23C 9/13* | (2006.01) | |
| *A23C 1/12* | (2006.01) | |
| *A23C 3/02* | (2006.01) | |
| *A23C 7/04* | (2006.01) | |

(52) U.S. Cl.
CPC .............. *A23C 9/1512* (2013.01); *A23C 1/12* (2013.01); *A23C 3/02* (2013.01); *A23C 7/04* (2013.01); *A23C 9/13* (2013.01); *A23C 9/142* (2013.01); *A23C 9/148* (2013.01); *A23C 9/1422* (2013.01); *A23C 9/16* (2013.01); *A23C 2210/208* (2013.01); *A23C 2210/252* (2013.01)

(58) Field of Classification Search
CPC .... A23C 9/18; A23C 1/04; A23C 9/14; A23C 9/152; A23C 9/16; A23C 1/12; A23C 3/033; A23C 9/13; A23C 9/1422; A23C 9/1512; A23C 3/02; A23C 7/04; A23C 9/142; A23C 9/148; A23C 9/116; A23C 2210/208; A23C 2210/252; A23L 3/22
USPC ...................................................... 426/34, 43
See application file for complete search history.

(56) References Cited

U.S. PATENT DOCUMENTS

| | | | | |
|---|---|---|---|---|
| 3,956,521 | A | * | 5/1976 | Pisecky ..................... A23C 1/04 426/588 |
| 4,490,403 | A | * | 12/1984 | Pisecky ..................... A23C 1/05 159/4.04 |
| 4,826,693 | A | * | 5/1989 | Smith .................. A23C 9/1512 426/34 |
| 6,635,296 | B1 | | 10/2003 | Nissen et al. |
| 2002/0155203 | A1 | | 10/2002 | Jensen |
| 2006/0204632 | A1 | * | 9/2006 | Barrett-Reis ........... A23L 33/18 426/580 |
| 2007/0104847 | A1 | * | 5/2007 | O'Mahony .......... A23C 9/1422 426/582 |
| 2012/0015082 | A1 | | 1/2012 | Holst et al. |
| 2014/0170266 | A1 | * | 6/2014 | Siemensma .............. A23C 3/08 426/61 |

FOREIGN PATENT DOCUMENTS

EP 2 679 098 A1 1/2014

OTHER PUBLICATIONS

NPL Pasteurization. Retrieved on Nov. 1, 2019.(https://www.idfa.org/news-views/media-kits/milk/pasteurization) (Year: 2019).*

* cited by examiner

*Primary Examiner* — Bhaskar Mukhopadhyay
(74) *Attorney, Agent, or Firm* — Dilworth & Barrese, LLP

(57) ABSTRACT

A low-bacteria milk powder with a WPNI of at least 2 is suggested, obtainable by
(a) providing a milk component;
(b) optionally, separating the cream from the milk component;
(c) subjecting the milk component from which the cream had been optionally separated to microfiltration, obtaining a low-bacteria permeate P1 and a bacteria-contaminated retentate R1;
(d) mixing the permeate with a liquid lipid phase and a solid active agent phase;
(e) optionally, subjecting the mixture obtained in step (d) to a temperature treatment; and
(f) processing the mixture of step (d) or (e) that had optionally been temperature-treated, obtaining a dry powder.

13 Claims, 1 Drawing Sheet

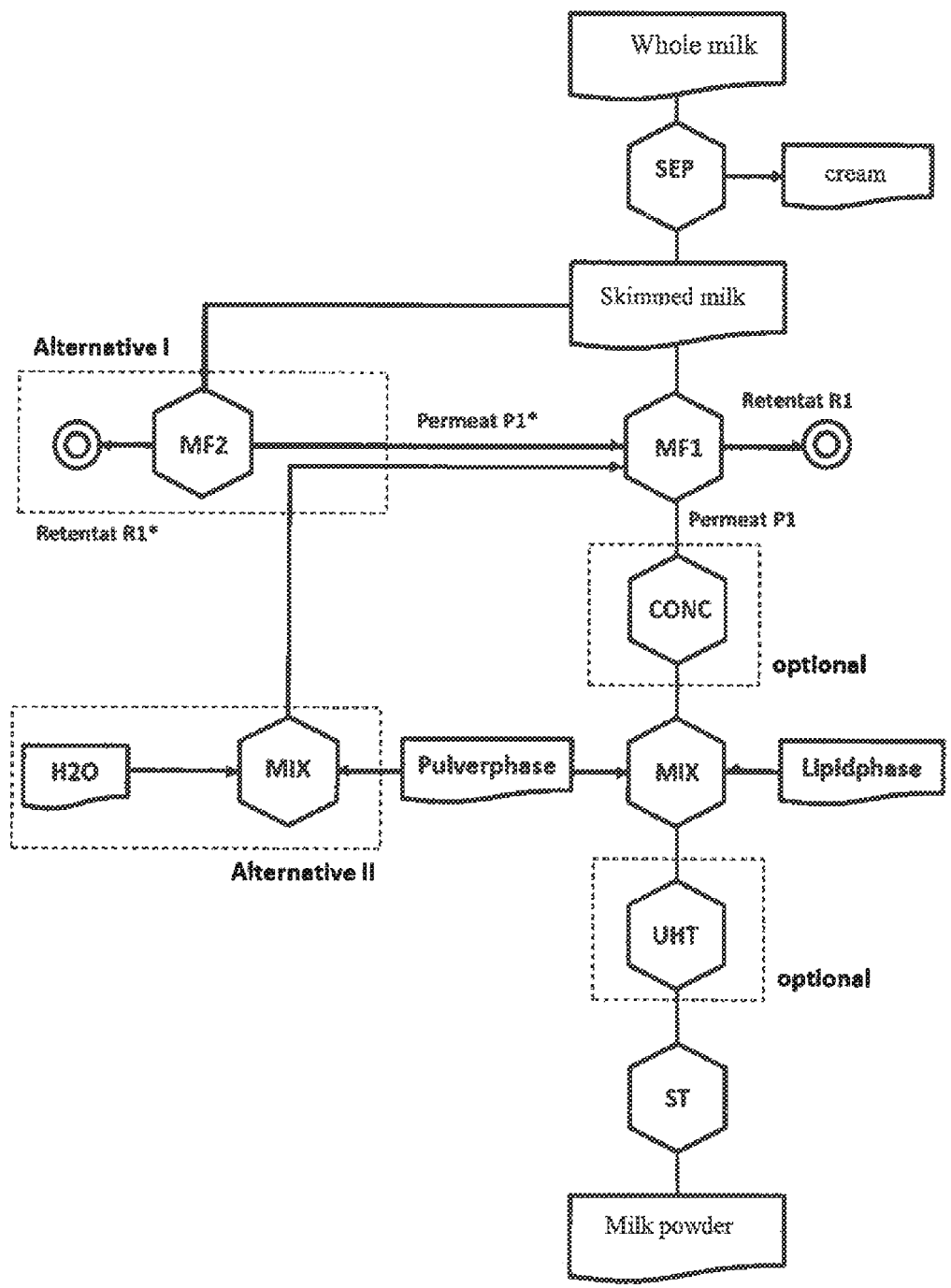

LOW-BACTERIA MILK POWDERS WITH A HIGH WHEY PROTEIN NITROGEN INDEX (IV)

FIELD OF THE INVENTION

The invention is in the field of dairy products and relates to novel low-bacteria milk powders with a high whey protein nitrogen index (WPNI), alternative processes for their production and their use, specifically for the nutrition of infants and toddlers.

STATE OF THE ART

For the production of low-bacteria milk powders, for example, already pasteurised skimmed milk with a dry matter content of about 9% is evaporated to a concentration of about 40%. However, the concentrates still contain a large quantity of heat-resistant bacteria and spores, which particularly originates from the maize silage fed to the cows, and which ends up in the raw milk as a result of insufficient stable hygiene. For this reason, it has been required to this date to subject the concentrates to high temperature treatment before spraying, by means of which the bacteria and spores are quantitatively destroyed, and as a result of which a bacteria-free and high-quality product is obtained.

However, high temperature treatment does not only have an effect on the bacteria and spores, also the valuable whey proteins are denatured, either completely or to a very large extent, thus adversely changing the product in its functionality and nutritional physiology. Whey proteins are in albumins and globulins; they particularly include alpha-lactalbumin and beta-lactoglobulin, serum albumin, proteose peptone and the immunoglobulins. From a nutritional perspective, whey proteins are high-value milk constituents, which are specifically used to build muscle, for example, in protein supplements. While untreated skimmed milk has a so-called whey protein nitrogen index (WPNI) of above 6, specifically of 6.1, as a parameter for its whey protein content, this value falls below 1 during regular ultra high temperature treatment, which is extremely undesired.

An alternative for this might consist in performing the temperature treatment at lower temperatures, for example, at about 70° C. instead of more than 100° C. In fact, products such obtained have a WPNI of above 5, however, the bacterial contamination is so high that products are obtained which are, at best, difficult to market.

In this context, it is referred to CN 2011 1116530 A1, which discloses a process for the production of low temperature milk powder, in the process of which skimmed milk is subjected to microfiltration at between 40 to 50° C., and filtered through an inorganic membrane with a pore size from 0.8 to 1.4 μm. Subsequently, the microfiltration product is sterilised at between 72 and 78° C. and concentrated at between 45 and 75° C. in a falling film evaporator. This is followed by spray drying, in the process of which the temperature at the inlet is between 180 and 200° C., and between 80 and 105° C. at the outlet. The document neither specifies the WPNI of the resulting products, nor does it contain any information on the bacterial contamination thereof.

EP 2679098 A1 (DMK) also discloses a process for the production of low-bacteria milk powders, wherein a microfiltration step is used to separate the bacteria; this application, however, does not contain any reference on the production of powders enriched with active agents.

However, the production of milk powders which are specifically intended for the nutrition of infants and toddlers is subject to particularly high requirements: regardless of the fact that a defined whey protein/casein ratio is desired, the products must be practically bacteria-free in order to not damage the developing intestinal flora. At the same time, the powders are also intended to contain a multitude of further active agents and additives which are beneficial for the nutrition and development of the child such as, for example, (milk) fats, vitamins, carbohydrates, peptides or amino acids, long-chain unsaturated fatty acids and the like. As these substances are typically neither produced nor stored under sterile conditions, they exhibit a considerable bacterial count which leads to an undesired contamination when mixed with the milk component that had just been decontaminated by microfiltration. This should to be regarded even more critically, as, particularly, added powder products often contain pathogenic bacteria such as *Cronobacter Sakazakii, Salmonella Enterica, Staphylococcus Aureus* or *Listeria Monocytogenes*, which—as is self-evident—must definitely not be found in baby food.

The task of the present invention was therefore to provide milk powders, in fact, both skimmed milk powders and whole milk powders, which are both bacteria-free or low-bacteria and only obtained by high temperature processes to this date, and which also have a high WPNI of at least 2, specifically at least 4, and particularly from 5.5 to 6 and above as obtained by low temperature processes, although these parameters had been running in opposite directions to this date. Fat-soluble and water-soluble additives are intended to be added to the powders at the same time without introducing any further bacteria. In addition, the process should be performable with little technical effort.

DESCRIPTION OF THE INVENTION

A first subject-matter of the invention relates to a low-bacteria milk powder with a WPNI of at least 2, which is obtainable by (a) providing a milk component;

(b) optionally, separating the cream from the milk component;

(c) subjecting the milk component from which the cream had been optionally separated to microfiltration, obtaining a low-bacteria permeate P1 and a bacteria-contaminated retentate R1;

(d) mixing the permeate P1 with a liquid lipid phase and a solid active agent phase;

(e) optionally, subjecting the mixture obtained in step (d) to a temperature treatment; and (f) processing the mixture of step (d) or (e), which had optionally been temperature-treated, obtaining a dry powder.

Surprisingly, it was found that the process of the invention particularly allows the production of milk powders with additives, which are admissible for the nutrition of infants and toddlers, having a high WPNI of at least 2 and up to 7.5, preferably from about 3.5 to 6, and particularly from about 4 to about 5 at the same time, and which are still practically bacteria-free, namely having a bacterial count with respect to both the thermophilic bacteria and the mesophilic bacteria of 500 maximum, depending on the processing even of a total count (thermophilic+mesophilic bacteria) from about 100 to about 500. According to experience, products are obtained which do not exhibit any pathogenic bacteria any more.

BRIEF DESCRIPTION OF THE DRAWING

The present invention will be described in greater detail with reference to the accompanying drawing which is a flow chart illustrating the method according to the present invention.

PROCESS

A further subject-matter of the invention relates to a first process for the production of low-bacteria milk powders with a WPNI of at least 2, comprising the following steps:

(a) providing a milk component;
(b) optionally, separating the cream from the milk component;
(c) microfiltration of the milk component of step (a) or (b), from which the cream had been optionally separated, obtaining a low-bacteria permeate P1 and a bacteria-contaminated retentate R1;
(d) mixing the permeate P1 with a liquid lipid phase and a solid active agent phase;
(e) optional temperature treatment of the mixture obtained in step (d); and
(f) processing of the mixture of step (d) or (e), which had optionally been temperature-treated, obtaining a dry powder.

Suitable milk components which can be employed as raw materials in the process are selected from the group consisting of whole milk, skimmed milk with a fat content of up to 4% by weight, low-fat milk, pasteurised milk, high temperature treated milk, ultra high temperature treated milk, whey, fine whey, soured milk and mixtures thereof.

Preferably, whole milk or whey is employed. When components are used which had already been skimmed, step (b) is omitted.

Separatin of Cream

Skimming of the raw milk is preferably performed in heat exchangers, whereby, specifically, plate heat exchangers have proved to be particularly suitable. There is a temperature gradient at the heat exchangers, which, however, is selected such that the raw milk is heated to a temperature from about 70 to 80° C. and particularly from about 72 to 74° C. for a residence time of a minimum of 20 and a maximum of 60 seconds, preferably about 30 seconds, thus already being pasteurised once.

The separation of solids ("casein dust") and the skimming of a fat content of about 4% by weight is usually carried out in a downstream component, preferably a separator. Said components are adequately known from the state of the art. Separators of the company GEA Westfalia Separator GmbH, which allow to perform both steps individually or together (http://www.westfalia-separator.com/de/anwendungen/molkereitechnik/milch-molke.html), are widely used in the dairy industry. Corresponding components have also been disclosed, for example, in DE 10036085 C1 (Westfalia) and are perfectly known to one skilled in the art. Therefore, no explanations are needed on how to carry out these process steps, as they are understood to be part of the general specialist knowledge.

Microfiltration

Microfiltration is a process for the separation of substances. The essential difference between microfiltration and ultrafiltration is in the different pore sizes and in the different membrane structure, as well as in the materials and filter materials involved. Filtration through membranes having a pore size <0.1 μm is usually referred to as ultrafiltration, while filtration at pore sizes >0.1 μm is commonly referred to as microfiltration. In both cases, this concerns purely physical, i.e., mechanical membrane separation methods which apply the principle of mechanical size exclusion: all particles in the fluids which are larger than the membrane pores are retained by the membrane. The driving force in both separation methods is the differential pressure between the inlet and the outlet of the filter area, which is between 0.1 and 10 bar. Depending on the area of application, the filter area material may consist of stainless steel, synthetic material, ceramics or textile fabric. Filter elements appear in different forms: candle filters, flat membranes, spiral coil modules, bag filters and hollow fibre modules, all of which are, in principle, suitable within the meaning of the present invention.

In dairy technology, there has been the prejudice that the pore size should have a value of no less than 0.5 μm for the separation of microorganisms and the fat constituents in the raw milk. This invention, however, includes the finding that a size within the range of 1.4 μm and less, preferably 1.3 to 1.4 μm, is completely sufficient for the production of a Class I raw milk, if the majority of the thermolabile bacteria has been separated by corresponding thermal treatment before. Combining this comparably larger pore size with a microfiltration device which substantially consists of a ceramic membrane solves the problem of frequent clogging at the same time.

Microfiltration may, in principle, be performed in the range from about 6 to about 60° C. However, there is the prejudice that the separation of bacteria by means of filtration steps requires a temperature from at least 55° C. to about 60° C., as only these conditions allow sufficient flow rates, whereas at temperatures of, for example, 20 to 30° C. flow rates of only 100 l/m²h maximum are obtained. Filtration under warm conditions is also possible in the present process, however, it has the significant disadvantage that the heat-resistant bacteria and spores start to grow through the membranes after about 4 hours filtration time, proliferating in the permeate. Therefore, a particular advantage within the scope of the process of the invention is performing the filtration under cold conditions, i.e., from about 6 to about 30° C. and, preferably, from about 8 to about 20° C., as this manner prevents the bacteria from growing through while, surprisingly, a flow rate from 200 to 300 l/m²h is still achieved.

Concentration

A low-bacteria to bacteria-free permeate P1 which is further processed, and a retentate which is usually discharged due to its high bacterial contamination are obtained during microfiltration.

As an optional measure, this may be followed by a step in which the permeate is dehydrated and concentrated to a dry matter content from about 30 to 55% by weight, particularly from about 35 to about 45% by weight. Conventional evaporators are particularly suitable here.

Mixing

Mixing may be performed in each conventional stirrer, provided that it can be heated. The permeate phase, optionally after concentration, is presented and mixed with a lipid phase and a powder phase. The lipid phase includes lipids, vitamins and fat-soluble active agents such as long-chain unsaturated fatty acids and the like. As the fatty phase easily solidifies, it is recommended to perform the mixture at temperatures in the range of about 60° C. In contrast with that, the solid active agent phase contains proteins and water-soluble substances.

Temperature Treatment

In order to avoid that the mixed product is undesirably contaminated by bacteria via the lipid and powder phases again, the product is usually subjected to temperature treatment. This may be a common pasteurisation, preferably, however, an ultra high temperature treatment in which the mixture is heated to temperatures from 90 to 140° C. for a period from about 1 to about 5 seconds. Under these conditions the thermal load is strong enough to reduce the bacterial count according to specification without denaturing the delicate whey proteins.

Drying

After the temperature treatment, the heated concentrate is transferred to a dry powder. To this end, belt drying, freeze drying, and spray-drying in particular are suitable. Typically, the mixtures are supplied to the tower at temperatures from 180 to 260° C. and, preferably, at about 200° C.; after passing various heat exchanger units, they will leave it at a temperature in the range from 25 to 35° C.

The powders typically contain a residual moisture from 1 to 5, preferably 2 to 3% by weight, in which fat is more or less evenly distributed in the fat-free dry substances in the form of inclusions, i.e., in the proteins, sugars and salts.

Alternative Processes 1 and 2

On the one hand, the pasteurisation step following the mixing step is required to kill the new bacteria that have been introduced by the additives; on the other hand, this is particularly energy-intensive so that there had been a particular interest within the meaning of an additional task to embody the process of the invention such that any thermal post-treatment becomes unnecessary.

Therefore, two process variants are shown in the following, by means of which the additional task may be solved without leaving the scope of the common inventive idea. In doing so, particularly the finding is considered that the lipid phase practically does not cause any danger of contamination and that only the powder phase should be regarded critically, and in this it is, particularly, the phase when, among other things, whey proteins, so-called WPC (whey protein concentrates), are added.

A further subject-matter of the invention therefore relates to a first alternative process for the production of low-bacteria milk powders with a WPNI of at least 2, comprising the following steps:

(a) providing a milk component;
(b) optionally, separating the cream from the milk component;
(c) providing a liquid phase, containing dissolved active agents;
(d) common microfiltration of the milk component of step (a) or (b), from which the cream had been optionally separated, with the liquid active agent phase of step (c), obtaining a low-bacteria permeate P1 and a bacteria-contaminated retentate R1;
(e) mixing the permeate P1 with a liquid lipid phase;
(f) processing of the mixture of step (d) or (e) that had optionally been temperature-treated, obtaining a dry powder.

In contrast to the original process, this variant involves dissolving the powder fraction in water or in skimmed milk and adding it to the microfiltration step. In doing so, the bacteria contained in the powder are removed in this step so that any thermal post-treatment is not required. A concentration step may, certainly, also be included in this process.

A further subject-matter of the invention further relates to a first process for the production of low-bacteria milk powders with a WPNI of at least 2, comprising the following steps:

(a) providing a first milk component;
(b) optionally, separating the cream from the first milk component;
(c) providing a skimmed milk component;
(d) microfiltration of the skimmed milk component, obtaining a whey protein-rich permeate P1* ("ideal whey") and a casein-rich retentate R1*;
(e) microfiltration of the milk component of step (a) or (b), from which the cream had been optionally separated, with the permeate P1* of step (d), obtaining a low-bacteria permeate P1 and a bacteria-contaminated retentate R1;
(f) mixing of the permeate P1, a liquid lipid phase and, optionally, a solid active agent phase;
(g) processing of the mixture of step (f), obtaining a dry powder.

In this process variant, adding the important whey proteins via the powder phase is omitted. Those are directly produced from a skimmed milk instead and supplied to the micro-filtration step of the milk component as a further liquid permeate phase 1*. Thus, the permeate P1 produced this way already contains the whey proteins, whereby the bacteria contained in the whey protein phase are also separated via the retentate 1. As described above, the lipid phase and, if required, also the powder phase can be added to the liquid phase. Also in this case, no thermal post-treatment is required.

It is also possible to combine the alternative processes I and II.

Industrial Application

A further subject-matter of the invention relates to the use of the milk powder of the invention, and of the milk powder obtained according to the processes of the invention for the nutrition of infants and toddlers, in particular.

EXAMPLES

Comparison Example V1

Solid components were removed from raw milk in a manner known per se, it was pasteurised and skimmed so that a skimmed milk having a dry matter content of about 9% by weight was obtained. This mixture was intensely mixed with a lipid phase containing milk fat, vitamins and lactose at 60° C., as well as with a water-free powder phase in which whey proteins were present. Subsequently, the mixture was carefully evaporated to a dry matter content of about 40% by weight. The concentrate such obtained had a WPNI of 6.1 and was subjected to high temperature treatment at 120° C. for a period of about 5 seconds, in the process of which spores and other bacteria were quantitatively destroyed. A bacteria-free concentrate was obtained that was subsequently sprayed via a tower. A practically bacteria-free, high temperature skimmed milk powder with a WPNI of only 1.3 was obtained.

Comparison Example V2

Example V1 was repeated, however, instead of the high temperature treatment at 105° C., a temperature treatment at 70° C. was performed for 5 seconds. After spraying, a low temperature skimmed milk powder with a WPNI of 5.9 was obtained which, however, was contaminated with bacteria (thermophilic and mesophilic bacteria, each >1,000) and was, therefore, suitable for consumption to a limited degree only.

Example 1

Example V2 was repeated, however, before the evaporation step, the skimmed milk was subjected to microfiltration at 55° C. using a ceramic membrane having a pore size of 1.3 μm. The retentate was discharged, the permeate was mixed with both the lipid phase and the powder phase as described above, and evaporated. Subsequently, the concentrate was thermally treated at about 120° C. for 5 seconds and sprayed. A skimmed milk powder having a WPNI of 6.8 was obtained, which was practically bacteria-free (thermophilic and mesophilic bacteria, each <500).

Example 2 (Alternative I)

Example 1 was repeated, however, the powder phase was dissolved in water and subjected to microfiltration together with the skimmed milk at 55° C., using a ceramic membrane having a pore size of 1.3 μm. The retentate was discharged, the permeate was mixed with the lipid phase as described above, and evaporated. Subsequently, the concentrate was sprayed without any further temperature treatment. A skimmed milk powder having a WPNI of 7.0 was obtained, which was bacteria-free (thermophilic bacteria <100 and mesophilic bacteria <400).

Example 3 (Alternative II)

Skimmed milk was subjected to microfiltration at 55° C. using a ceramic membrane having a pore size of 0.1 μm, and a protein-rich permeate and a casein-rich retentate were obtained. The permeate was subjected to a second microfiltration step together with a further untreated skimmed milk fraction using a ceramic membrane having a pore size of 1.3 μm. The retentate was discharged, the permeate was mixed with the lipid phase and with a powder phase which substantially consisted of vitamins and lactose, as described above, and evaporated. Subsequently, the concentrate was sprayed without any further temperature treatment. A skimmed milk powder having a WPNI of 7.0 was obtained, which was also bacteria-free (thermophilic bacteria <100 and mesophilic bacteria <400).

Examples 1 to 3 are further explained in a flow chart (FIG. 1). The abbreviations have the following meanings:
SEP=separator
MF1=microfiltration with a 1.3 μm membrane
MF2=microfiltration with a 0.1 μm membrane
CONC=evaporator/concentrator
MIX=mixer
UHT=ultra high temperature treatment device
ST=spray tower

The invention claimed is:

1. A process for the production of a low-bacteria milk powder with a whey protein nitrogen index of at least 2, consisting of the following steps:
    (a) providing whole milk;
    (b) separating cream from the whole milk to obtain skimmed milk and pasteurizing the skimmed milk to obtain pasteurized skimmed milk;
    (c) dissolving solid active agents containing proteins and water soluble active agents in water or in skimmed milk to provide a liquid phase;
    (d) subjecting the pasteurized skimmed milk of step (b) to microfiltration together with the liquid phase of step (c) to obtain a low-bacteria permeate P1 and a bacteria-contaminated retentate R1; wherein the microfiltration is performed with a ceramic membrane having a pore size in the range of from 1.3 to 1.4 μm;
    (e) mixing the low-bacteria permeate P1 with a liquid lipid mixture containing lipids, vitamins and fat-soluble active agents to obtain a mixture;
    (f) concentrating the mixture of step (e) to obtain a concentrated mixture; and
    (g) drying the concentrated mixture of step (f), without prior thermal treatment, to obtain the low-bacteria milk powder.

2. The process of claim 1, wherein microfiltration is performed at a temperature in the range from about 6 to about 60° C.

3. The process of claim 1, wherein the permeate P1 obtained after microfiltration is concentrated to a dry matter content from 30 to 55% by weight before mixing.

4. The process of claim 1, wherein said liquid phase of step (c) comprises water, said proteins and said water soluble active agents.

5. The process of claim 1, wherein said liquid phase of step (c) comprises skimmed milk, said proteins and said water soluble active agents.

6. The process of claim 1, wherein microfiltration step (d) is performed at a temperature in the range from about 6 to about 30° C.

7. The process of claim 1, wherein microfiltration step (d) is performed at a temperature in the range from about 8 to about 20° C.

8. The process of claim 1, wherein microfiltration step (d) has a flow rate of from 200 to 300 l/m2h.

9. The process of claim 1, wherein the low-bacteria milk powder has a whey protein nitrogen index of at least 4.

10. The process of claim 1, wherein the low-bacteria milk powder has a whey protein nitrogen index of at least 6.

11. The process of claim 1, wherein the mixing step (e) is conducted at a temperature of about 60° C.

12. The process of claim 1, wherein the drying step (g) is performed at a temperature in the range of from 180 to 260° C.

13. The process of claim 1, wherein the milk of step (a) and the skimmed milk of step (c) are cow's milk.

* * * * *